United States Patent
Miura

(10) Patent No.: US 7,545,443 B2
(45) Date of Patent: Jun. 9, 2009

(54) IMAGE SIGNAL PROCESSING APPARATUS AND METHOD

(75) Inventor: Satoshi Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 564 days.

(21) Appl. No.: 10/512,517

(22) PCT Filed: Feb. 27, 2004

(86) PCT No.: PCT/JP2004/002432

§ 371 (c)(1),
(2), (4) Date: Oct. 25, 2004

(87) PCT Pub. No.: WO2004/077818

PCT Pub. Date: Sep. 10, 2004

(65) Prior Publication Data

US 2005/0195333 A1    Sep. 8, 2005

(30) Foreign Application Priority Data

Feb. 27, 2003   (JP) ............................ 2003-051866

(51) Int. Cl.
*H04N 5/52* (2006.01)
(52) U.S. Cl. .................... 348/678; 348/677; 348/712
(58) Field of Classification Search ................ 348/678, 348/690, 691, 571, 712
See application file for complete search history.

(56) References Cited

U.S. PATENT DOCUMENTS

| 4,204,229 A | * | 5/1980 | Heuze | 348/683 |
| 4,369,466 A | * | 1/1983 | Matsuzaki et al. | 348/690 |
| 4,654,711 A | * | 3/1987 | Mikado | 348/26 |
| 5,406,336 A | | 4/1995 | Harlos et al. | |
| RE36,750 E | * | 6/2000 | Lake, Jr. | 348/571 |
| 2002/0051090 A1 | | 5/2002 | Onagawa | |

FOREIGN PATENT DOCUMENTS

| EP | 0 599 398 | 6/1994 |
| JP | 2-231879 | 9/1990 |
| JP | 4-34073 | 3/1992 |
| JP | 6-245101 | 9/1994 |
| JP | 2002-142132 | 5/2002 |

OTHER PUBLICATIONS

Patent Abstracts of Japan, publication No. 10-271409, publication date Oct. 9, 1998.

* cited by examiner

*Primary Examiner*—Trang U Tran
(74) *Attorney, Agent, or Firm*—Frommer Lawrence & Haug LLP; William S. Frommer; Thomas F. Presson

(57) ABSTRACT

In a conventional contrast adjustment circuit, since an entire signal level of a luminance signal is shifted, peak luminance is lowered, and luminance deterioration is undesirably raised. In the present invention, a direct-current component of a luminance signal is shifted according to need, and a predetermined expansion processing to increase a signal level of highlight portion is performed for a luminance signal having its direct-current component shifted.

10 Claims, 5 Drawing Sheets

IMAGE SIGNAL PROCESSING APPARATUS AND METHOD

TECHNICAL FIELD

The present invention relates to an apparatus and method for processing a video signal which are desirably used in, for example, a color television receiver.

BACKGROUND ART

Conventionally, color television receivers employ a method of intentionally lowering reproduction of a direct-current component of a luminance signal so as to raise apparent contrast (Refer to, for example, Patent Document 1).

FIG. 7 shows a block diagram of one example of a conventional contrast adjustment circuit 1 that performs above-described signal processing, which includes an average luminance calculation unit 2 and a DC shift unit 3.

In the contrast adjustment circuit 1, the average luminance calculation unit 2 calculates the average level of a supplied luminance signal S1 over one field period or one frame period, and sends thus calculated average level to the DC shift unit 3 as an average level detection signal S2.

The DC shift unit 3 shifts a direct-current component of the luminance signal S1 depending on the average level of the luminance signal S1. That is, based on the average level detection signal S2, the DC shift unit 3 completely reproduces a direct-current component DC of the luminance signal S1 when its average level is "0" or all-black signal, and lowers reproduction ratio of a direct-current component as the average level becomes high.

FIG. 8 shows input-output characteristics of a luminance signal that undergoes above-described signal processing. In FIG. 8, $f_1$ indicates input-output characteristics obtained by changing an input level of small area part of an image that hardly affects the average level when the average level of the luminance signal S1 is low, while $f_2$ indicates input-output characteristics obtained by changing the input level of small area part of an image that hardly affects the average level when the average level of the luminance signal S1 is high.

As is apparent from FIG. 8, when the average level of the luminance signal S1 is high, the image somewhat becomes an all-black image (when an input level of $f_2$ is between "0" to "a" in FIG. 8), while apparent contrast of the image seems to be raised as a whole.

[Patent Document 1]

Japanese Patent Application Laid-Open Publication No. 10-271409 (on page 3, FIG. 1).

However, in above-described conventional contrast adjustment circuit 1, since a direct-current component of the luminance signal S1 is shifted based on its average level to raise apparent contrast, an entire signal level of the luminance signal S1 is shifted, which undesirably lowers peak luminance (the maximum level of a luminance signal), as is apparent from FIG. 8.

Such phenomenon is not a big problem for a color television receiver using a CRT (Cathode-Ray Tube) as a display unit that can originally make the dynamic range of the highlight side luminance and that of the cut off side luminance large, but leads to a problem of deterioration of the highlight side luminance for a color television receiver using a liquid crystal panel or a plasma display as a display unit that cannot make the dynamic range of the highlight side luminance and that of the cut off side luminance large.

DISCLOSURE OF THE INVENTION

In view of above-described points, the present invention provides an apparatus and method for processing a video signal that can improve image quality, while preventing luminance deterioration.

The present invention has an object to overcome the above-mentioned drawbacks by providing an apparatus for processing a video signal, including: a direct-current component shift processing means for shifting a direct-current component of a first luminance signal that is a luminance component of a supplied video signal according to need; and an expansion means for performing a predetermined expansion processing to increase signal level of highlight portion for a second luminance signal that is the first luminance signal having its direct-current component shifted. As a result, the apparatus for processing a video signal can effectively prevent lowering of the signal level of highlight portion of the first luminance signal due to the shift of the direct-current component.

Also the above object can be attained by providing a method for processing a video signal, including: a first step of shifting a direct-current component of a first luminance signal that is a luminance component of a video signal according to need; and a second step of performing a predetermined expansion processing to increase a signal level of highlight portion for a second luminance signal that is the first luminance signal having its direct-current component shifted. As a result, the method for processing a video signal can effectively prevent lowering of the signal level of highlight portion of the first luminance signal due to the shift of the direct-current component.

BEST MODE FOR CARRYING OUT THE INVENTION

An embodiment of the present invention will be described in detail below with reference to the accompanying drawings.

Figure 1:
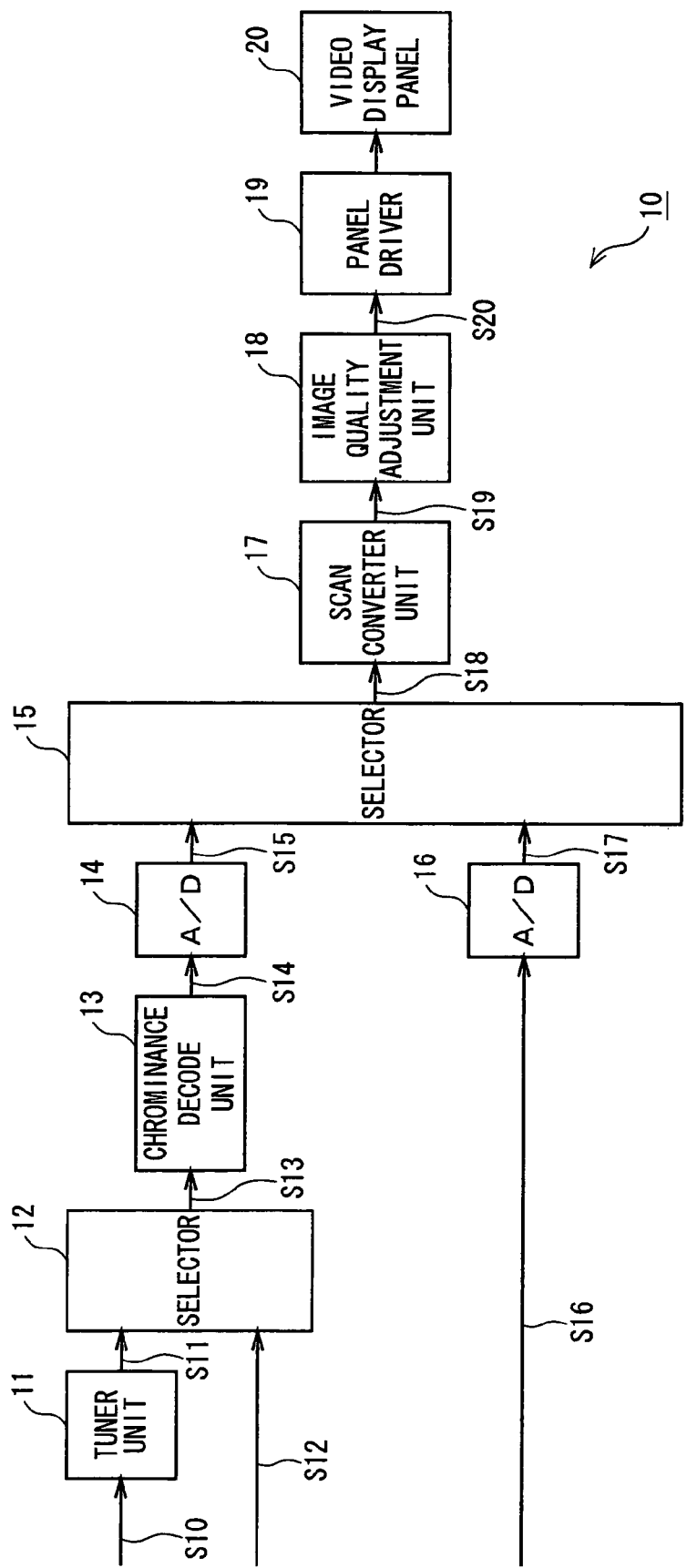
FIG. 1 shows a block diagram of a color television receiver employing the present invention.

(1) Configuration of a Color Television Receiver 10 of the Present Invention FIG. 1 shows a block diagram of a color television receiver 10 of the present invention, and a television broadcasting signal S10 which is received by an antenna, not shown, is sent to a tuner unit 11.

The tuner unit 11 extracts a video signal S11 of a channel that is designated by a user from the supplied television broadcasting signal S10, and sends thus extracted video signal S11 to a selector 12.

The selector 12 selects either the video signal S11 sent from the tuner unit 11 or a video signal S12 that may be supplied from an external device such as a video tape recorder through an external input terminal arranged at the rear side of the color television receiver 10 under designation by the user, and sends thus selected signal to a chrominance decode unit 13 as a selected video signal S13.

The chrominance decode unit 13 separates thus supplied selected video signal S13 into a luminance signal (Y) and a chrominance signal (C), and performs a predetermined color-demodulation processing for the chrominance signal to send thus obtained video signal S14 to an analog/digital conversion circuit 14. The analog/digital conversion circuit 14 A/D-converts the supplied video signal S14, and sends the obtained digital video signal S15 to a selector 15.

At the same time, the selector 15 is supplied with a digital video signal S17 that is obtained at an analog/digital conversion circuit 16 by A/D-converting a video signal S16 that may be supplied from an external device such as a DVD (Digital Versatile Disc) etc. through an external input terminal arranged at the rear side of the color television receiver 10.

In this manner, the selector 15 selects either the digital video signal S15 sent from the chrominance decode unit 13 through the analog/digital conversion circuit 14 or the digital video signal S17 sent from an external device through the analog/digital conversion circuit 16 under designation by the user, and sends the selected signal to a scan converter unit 17 as a selected digital video signal S18.

The scan converter unit 17 performs a predetermined signal processing for the supplied selected digital video signal S18 such as, filtering processing to make the signal comply with the number of pixels of a video display panel 20, synchronization processing along horizontal direction as well as vertical direction, etc., and sends an obtained scan-converted video signal S19 to an image quality adjustment unit 18.

The image quality adjustment unit 18 performs various predetermined signal processings to adjust image quality for the supplied scan-converted video signal S19 such as contrast adjustment processing, luminance adjustment processing, etc., and performs matrix processing to convert the signal to three primary color signals of red (R), green (G), and blue (B), and then sequentially sends thus obtained display video signal S20 to a panel driver 19.

The panel driver 19 drives the video display panel 20, which may be a liquid crystal panel or a plasma display, based on the supplied display video signal S20 to display an image based on the display video signal S20 on the video display panel 20.

Thus, the color television receiver 10 displays an image of a channel designated by the user or an image based on a video signal supplied from an external device on the video display panel 20 after performing a predetermined signal processing such as contrast adjustment.

(2) Configuration of a Contrast Adjustment Circuit 30

Next, the configuration of a contrast adjustment circuit 30 that is arranged in the image quality adjustment unit 18 of the color television receiver 10 and performs contrast adjustment processing will be explained.

Figure 2:
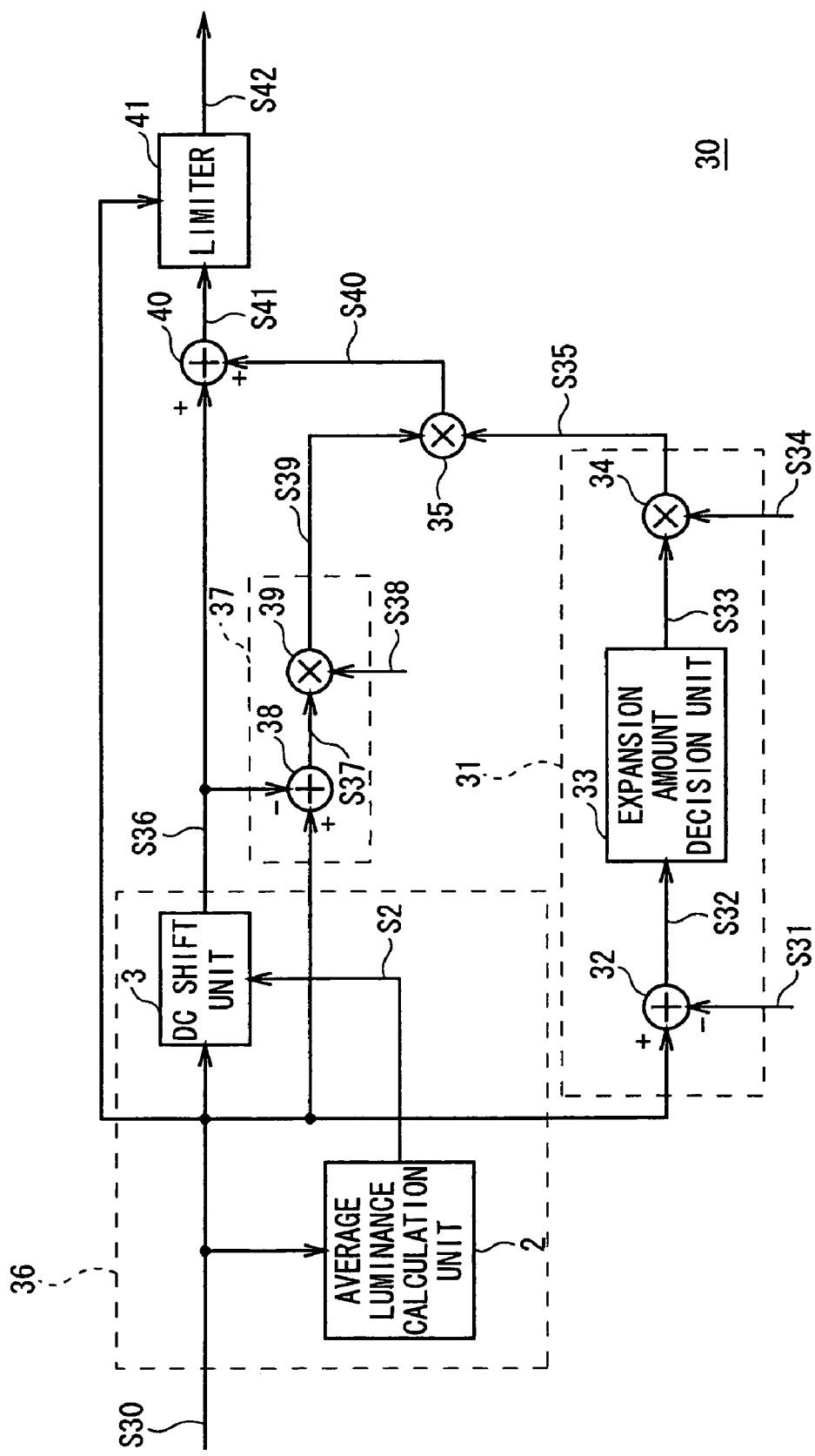
FIG. 2 shows a block diagram of a contrast adjustment circuit employing an embodiment of the present embodiment.
Figure 7:
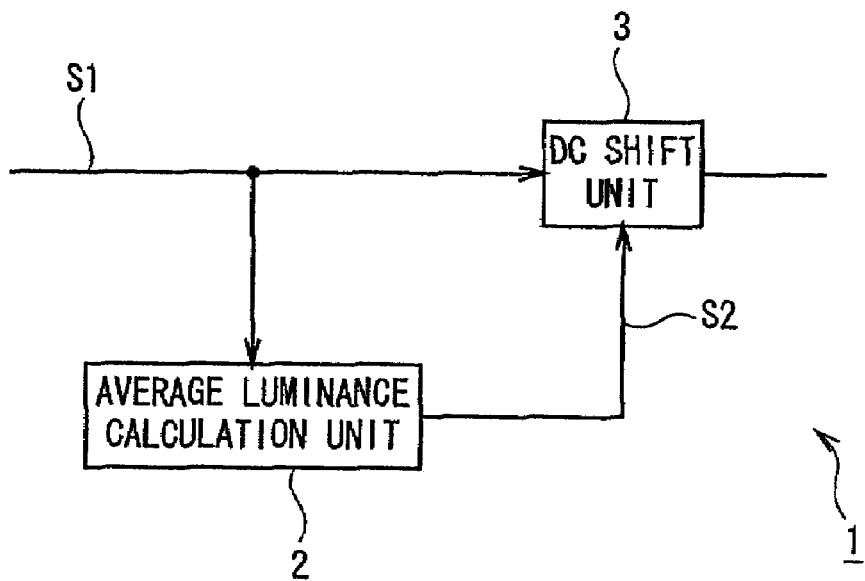
FIG. 7 shows a block diagram of a conventional contrast adjustment circuit.
Figure 8:
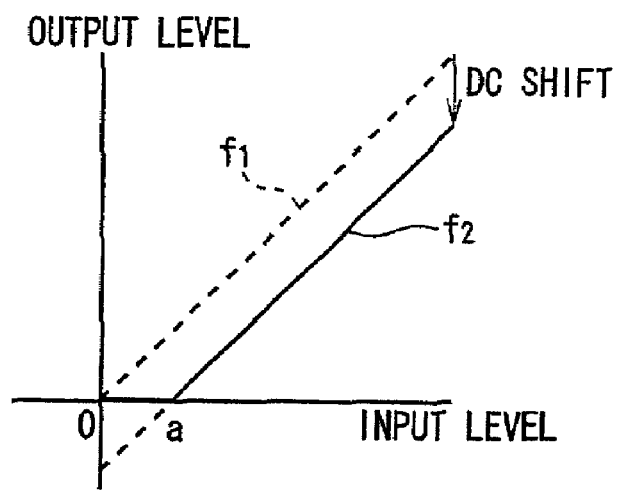
FIG. 8 shows input-output characteristics for explaining DC shift processing in a conventional contrast adjustment circuit.

FIG. 2 shows a block diagram of the contrast adjustment circuit 30 of the present embodiment, in which units corresponding to those in FIG. 7 are indicated with the same reference numerals. The contrast adjustment circuit 30 detects a highlight portion of a luminance signal S30 that is a luminance component of the scan-converted video signal S19, and superposes a signal having a signal level corresponding to a signal level of the highlight portion on the corresponding portion (highlight portion) of the luminance signal S30 that has undergone DC level shift processing (or a DC-shifted luminance signal S36 to be described later) so as to expand the highlight portion of the luminance signal S30 that has undergone the DC level shift processing (DC-shifted luminance signal S36) so that lowering of peak luminance raised by the DC level shift can be prevented.

In real processing, in the contrast adjustment circuit 30, the luminance signal S30 of the scan-converted video signal S19 supplied from the scan converter unit 17 shown in FIG. 1 is sent to a subtraction circuit 32 for detecting a highlight portion arranged in an expansion amount decision block 31.

At this time, the subtraction circuit 32 is supplied with a reference signal S31 whose signal level (data value) is equal to a predetermined threshold value SL that is stored in a memory, not shown, in advance as the minimum required signal level to become the highlight portion of the luminance signal S30 (referred to as highlight portion detection threshold value SL, hereinafter). Then, the subtraction circuit 32 sequentially subtracts the reference signal S31 from the luminance signal S30, and sends thus obtained resultant signal to an expansion amount decision unit 33 as a difference detection signal S32.

The expansion amount decision unit 33 has a nonvolatile memory such as a ROM (Read Only Memory) having stored therein a look-up table in which a signal level of the difference detection signal S32 is made to correspond to the expansion amount for a portion of the luminance signal S30, at which portion the difference detection signal S32 comes to the signal level.

Actually, in the look-up table, with the signal level (data value) of the difference detection signal S32 set to be the address, corresponding expansion amount is stored at the address of the nonvolatile memory.

When supplied with the difference detection signal S32, using the signal level (data value) of the signal as the address, the expansion amount decision unit 33 reads out the expansion amount corresponding to the signal level from the nonvolatile memory based on the look-up table, and sends the read out expansion amount to a multiplication circuit 34 for adjusting the expansion amount as an expansion amount decision signal S33.

In this embodiment, in the expansion amount decision unit 33, the difference detection signal S32 whose signal level (data value) is "0" or smaller is set to be "0". In the look-up table, when the signal level of the difference detection signal S32 is "0", corresponding expansion amount is set to be "0" (that is, "0" is stored at a position whose address is "0" in the nonvolatile memory), while when the signal level of the difference detection signal S32 is "1" or more, corresponding expansion amount is set to be "y" that is obtained by the following function expression where "x" is the signal level $$y = x^2 \tag{1}$$

Figure 3:
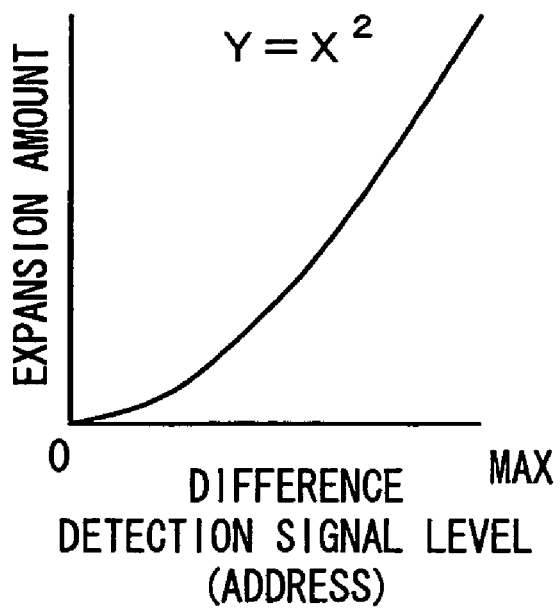
FIG. 3 shows a view for explaining the relation between addresses and expansion amount in a look-up table.

(in other words, "y" that is obtained by the function expression (1) is stored at respective positions whose address is "1" or more in the nonvolatile memory with their addresses set to be "x"), as shown in FIG. 3. It is noted that normalization processing is performed for the look-up table so that when the signal level of the difference detection signal S32 is maximum (data value is "255"), expansion amount is set to be maximum (data value of expansion amount is set to be "255").

Figure 4:
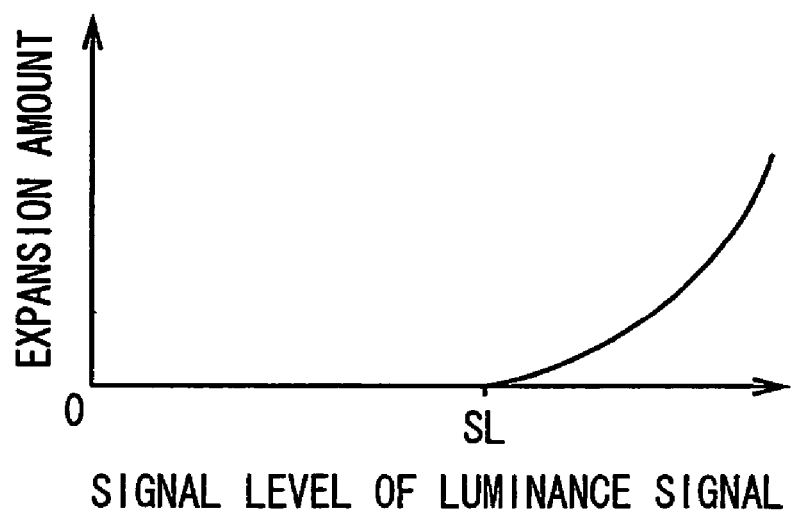
FIG. 4 shows a view for explaining the relation between a signal level of a luminance signal and expansion amount.

Consequently, in this embodiment, as shown in FIG. 4, in case the signal level of the luminance signal S30 is equal to the highlight portion detection threshold value SL, which is the signal level of the reference signal S31, or smaller, the expansion amount decision unit 33 outputs the expansion amount decision signal S33 whose signal level (data value) is "0", while in case the signal level of the luminance signal S30 is larger than the highlight portion detection threshold value SL, the expansion amount decision unit 33 outputs the expansion amount decision signal S33 whose signal level is equal to the square of the difference between the signal level of the luminance signal S30 and that of the reference signal S31. Then, thus output expansion amount decision signal S33 is sent to the multiplication circuit 34.

At this time, the multiplication circuit 34 is supplied with a first gain coefficient signal S34 whose signal level (data value) is equal to a predetermined gain coefficient $K_1 (0 \leq K_1 \leq 1)$ that is set up for adjusting the expansion amount by a circuit designer or user. Accordingly, the multiplication circuit 34 sequentially multiplies the expansion amount decision signal S33 by the first gain coefficient signal S34, and sends thus obtained gain multiplication expansion amount decision signal S35 to a multiplication circuit 35.

On the other hand, the luminance signal S30 that is a luminance component of the scan-converted video signal S19 shown in FIG. 1 sent from the scan converter unit 17 shown in FIG. 1 is also sent to a DC shift processing unit 36 including the average luminance calculation unit 2 and the DC shift unit 3 as well as to a subtraction circuit 38 of an adjustment gain generation block 37.

At this time, the DC shift processing unit 36 shifts a direct-current component of the luminance signal S30 depending on the average level of the luminance signal S30 according to need, and outputs thus obtained DC-shifted luminance signal S36 to the subtraction circuit 38.

The subtraction circuit 38 sequentially calculates DC shift amount of the luminance signal S30 by the DC shift processing unit 36 by sequentially subtracting the signal level of the DC-shifted luminance signal S36 from that of the luminance signal S30, and sends thus obtained resultant signal to a multiplication circuit 39 as a shift amount detection signal S37.

At this time, the multiplication circuit 39 is supplied with a second gain coefficient signal S38 whose signal level (data value) is equal to a predetermined gain coefficient $K_2 (0 \leq K_2 \leq 1)$ that is set up as a gain for adjusting the expansion amount to DC shift amount by a circuit designer or user. Accordingly, the multiplication circuit 39 sequentially multiplies the shift amount detection signal S37 by the second gain coefficient signal S38, and sends the obtained resultant signal to a multiplication circuit 35 as an adjustment gain signal S39.

The multiplication circuit 35 sequentially multiplies data value of the supplied adjustment gain signal S39 by data value of the gain multiplication expansion amount decision signal S35 to generate a superposition signal S40 to be finally superposed on the luminance signal S30 that has undergone DC level shift processing, and sends the superposition signal S40 to an addition circuit 40.

Figure 5:
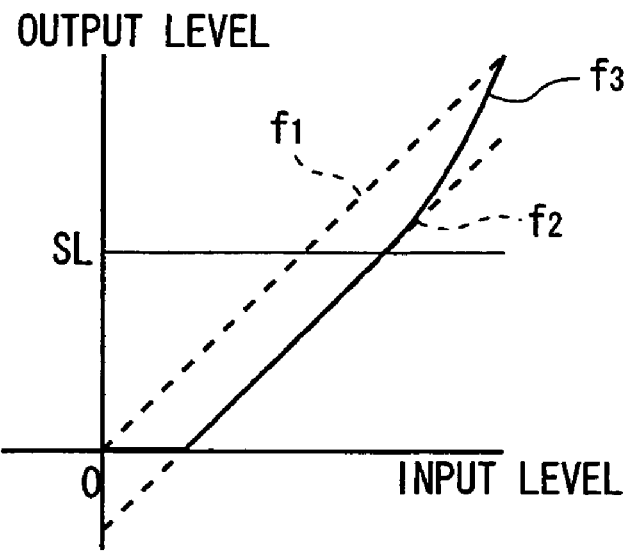
FIG. 5 shows input-output characteristics for explaining expansion of a DC-shifted luminance signal performed by superposing a superposition signal.

At this time, the addition circuit 40 is supplied with the DC-shifted luminance signal S36 from the DC shift processing unit 36. Thus, the addition circuit 40 sequentially adds data value of the superposition signal S40 to data value of the DC-shifted luminance signal S36 so as to sequentially superpose the superposition signal S40 on the DC-shifted luminance signal S36. Then, the addition circuit 40 generates an expanded luminance signal S41 that is the DC-shifted luminance signal S36 having its highlight portion expanded, as shown in FIG. 5 by a full line, and sends the expanded luminance signal S41 to a limiter 41.

Figure 6:
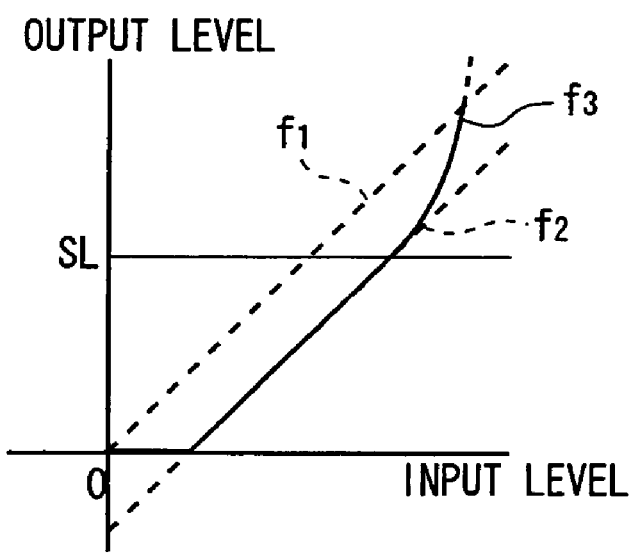
FIG. 6 shows input-output characteristics for explaining the processing of a limiter.

The limiter 41 sequentially compares the signal level of the luminance signal S30, which is supplied from outside and is not DC-shifted, and the signal level of the expanded luminance signal S41. Then, as shown in FIG. 6 by a full line, when the signal level of the expanded luminance signal S41 is equal to the signal level of the original luminance signal S30 or smaller, the limiter 41 sends the expanded luminance signal S41 to subsequent circuits as a contrast-adjusted luminance signal S42. On the other hand, when the signal level of the expanded luminance signal S41 is larger than the signal level of the original luminance signal S30, the limiter 41 sends the original luminance signal S30 to subsequent circuits as a contrast-adjusted luminance signal S42.

In this way, in the contrast adjustment circuit 30, DC shift processing depending on the signal level of the luminance signal S30 can be performed without lowering the level of highlight portion of the luminance signal S30.

(3) Operation and Effect of the Embodiment

In the above-described configuration, the contrast adjustment circuit 30 generates the superposition signal S40 having a signal level corresponding to a signal level of highlight portion of the luminance signal S30, and superposes the superposition signal S40 on a corresponding portion or highlight portion of the luminance signal S30 that has undergone DC level shift processing (DC-shifted luminance signal S36) so as to generate the luminance signal S30 having its contrast adjusted (expanded luminance signal S41).

Accordingly, in the contrast adjustment circuit 30, even if the luminance signal S30 is DC-shifted, lowering of the level of highlight portion can be prevented, and therefore lowering of peak luminance due to the DC shift of the luminance signal S30 can be effectively prevented.

In this case, in the contrast adjustment circuit 30, since the expansion amount corresponding to the highlight portion of the supplied luminance signal S30 is decided using a look-up table, even though complicated expansion curve is to be obtained, circuit configuration can be made small. Furthermore, since the look-up table is stored in a nonvolatile memory, contents can be changed easily.

Furthermore, in the contrast adjustment circuit 30, the adjustment gain signal S39, which has the signal level corresponding to the DC shift amount of the luminance signal S30 by the DC shift processing unit 36, generated at the adjustment gain generation block 37 is multiplied by the gain multiplication expansion amount decision signal S35 output from the expansion amount decision block 31 at the multiplication circuit 34. Thus, the highlight portion of the DC-shifted luminance signal S36 output from the DC shift processing unit 36 is expanded only when the DC shift processing unit 36 shifts a direct-current component of the luminance signal S30, and resulting expansion amount can be adjusted corresponding to the shift amount of the luminance signal S30, further improving apparent contrast.

Furthermore, in the contrast adjustment circuit 30, when the signal level of the expanded luminance signal S41 is equal to the signal level of the original luminance signal S30 or smaller, the limiter 41 sends the expanded luminance signal S41, on the other hand, when the signal level of the signal S41 is larger than the signal level of the signal S30, the limiter 41 sends the original luminance signal S30. Thus, signal level of the contrast-adjusted luminance signal S42 can be prevented from exceeding the signal level of the original luminance signal S30, which can prevent all-white image in which part of an image whose color is nearly white is displayed in white color.

In the above-described configuration, the superposition signal S40 having a signal level corresponding to a signal level of highlight portion of the luminance signal S30 is generated, and the superposition signal S40 is superposed on the luminance signal S30 that has undergone DC level shift processing (DC-shifted luminance signal S36) so as to generate the luminance signal S30 having its contrast adjusted (expanded luminance signal S41). Thus, lowering of peak luminance due to the DC shift of the luminance signal S30 can be effectively prevented, which can realize a color television receiver that can improve image quality, while preventing luminance deterioration.

(4) Other Embodiments

In the above-described embodiment, the apparatus and method for processing a video signal according to the present invention is applied to a color television receiver. However, the present invention is not restricted thereto and can be widely applied to various image display apparatuses that display a black-and-white image or color image such as a black-and-white television receiver, a monitor of a personal computer or the like.

In the above-described embodiment, the DC shift processing unit 36, which is a direct-current component shift processing unit that shifts a direct-current component of the supplied luminance signal S30 according to need, is composed of the average luminance calculation unit 2 and DC shift unit 3, as shown in FIG. 2. On the other hand, the present invention is not restricted to the configuration, and various other configurations can be employed.

Further, in the above-described embodiment, the expansion unit, which performs a predetermined expansion processing to increase a signal level of highlight portion for the luminance signal S30 having its direct-current component shifted or the DC-shifted luminance signal S36, is composed of the expansion amount decision block 31, adjustment gain generation block 37, multiplication circuit 35 and addition circuit 40. On the other hand, the present invention is not restricted to the configuration, and various other configurations can be employed. For example, the adjustment gain generation block 37 may be omitted.

In the above-described embodiment, the expansion amount decision block 31, which is a superposition signal generation unit that detects a highlight portion of the luminance signal S30 and generates the superposition signal S40 having a signal level corresponding to a signal level of the highlight portion, is composed of the subtraction circuit 32, expansion amount decision unit 33, and multiplication circuit 34. On the other hand, the present invention is not restricted to the configuration. For example, the multiplication circuit 34 may be omitted.

In this case, in the above-described embodiment, the expansion amount decision unit 33 decides expansion amount of highlight portion of the DC-shifted luminance signal S36 that is the luminance signal S30 having its direct-current component shifted using a look-up table. On the other hand, the present invention is not restricted to the configuration. For example, the expansion amount decision unit 33 may calculate and decide the expansion amount by performing calculation processing based on the signal level of the difference detection signal S32.

Furthermore, in this case, in the above-described embodiment, the expansion amount decision unit 33 uses a look-up table in which, when the signal level of the difference detection signal S32 is "1" or more, corresponding expansion amount is set to be "y" that is obtained by function expression (1) where "x" is the signal level. On the other hand, the present invention is not restricted to the configuration. For example, corresponding expansion amount may be set to be a linear function of the signal level "x" of the difference detection signal S32 or "y" that is obtained by function expression of third order or more of the signal level "x".

Note that, the present embodiment has an advantage that, the luminance change of an image in the vicinity of the highlight portion detection threshold value SL can be smoothed in case the signal level of the difference detection signal S32 and corresponding expansion amount are correlated under a quadratic function as compared with the case of being correlated under a linear function.

In the above-described embodiment, the superposition unit that superposes the superposition signal S40 on corresponding portion (highlight portion) of the DC-shifted luminance signal S36 employs an addition circuit. On the other hand, the present invention is not restricted to the configuration, and various other units can be employed.

Further, in the above-described embodiment, the adjustment gain generation block 37, which is a shift amount detection unit that detects shift amount of a direct-current component of the luminance signal S30 by the DC shift processing unit 36, is composed of the subtraction circuit 38 and multiplication circuit 39. On the other hand, the present invention is not restricted to the configuration, and various other configurations can be employed so long as shift amount of the direct-current component of the luminance signal S30 by the DC shift processing unit 36 can be detected. For example, the multiplication circuit 39 may be omitted.

Furthermore, in the above-described embodiment, the multiplication circuit 35, which is a multiplication unit that multiplies gain corresponding to the shift amount of the direct-current component of the luminance signal S30 by the DC shift processing unit 36 detected by the adjustment gain generation block 37 and the gain multiplication expansion amount decision signal S35, is employed. On the other hand, the present invention is not restricted to the configuration, and various other configurations can be employed.

As described in the above, the present invention provides an apparatus for processing a video signal which includes a direct-current component shift processing means for shifting a direct-current component of a first luminance signal that is a luminance component of a supplied video signal according to need, and an expansion means for performing a predetermined expansion processing to increase a signal level of highlight portion for a second luminance signal that is the first luminance signal having its direct-current component shifted. Thus, lowering of the signal level of highlight portion of the first luminance signal due to the shift of the direct-current component can be effectively prevented. In this manner, an apparatus for processing a video signal that can improve image quality, while preventing luminance deterioration can be realized.

Furthermore, the present invention provides a method for processing a video signal which includes a first step of shifting a direct-current component of a first luminance signal that is a luminance component of a video signal according to need, and a second step of performing a predetermined expansion processing to increase a signal level of highlight portion for a second luminance signal that is the first luminance signal having its direct-current component shifted. Thus, lowering of the signal level of highlight portion of the first luminance signal due to the shift of the direct-current component can be effectively prevented. In this manner, a method for processing a video signal that can improve image quality, while preventing luminance deterioration can be realized.

INDUSTRIAL APPLICABILITY

The present invention can be applied not only to a color television receiver, but also to various image display apparatuses that display a black-and-white image or color image such as a black-and-white television receiver, a monitor of a personal computer or the like.

The invention claimed is:

1. An apparatus for processing a video signal, comprising:
   direct-current component shift processing means for shifting a direct-current component of a first luminance signal that is a luminance component of a supplied video signal to generate a second luminance signal; and
   expansion means for performing a predetermined expansion processing to increase a signal level of a portion of the second luminance signal to a highlight portion of the first luminance signal so that a maximum luminance level of the second luminance signal equals a maximum luminance level of the first luminance signal,
   wherein the expansion means comprises:
      superposition signal generation means for detecting the highlight portion of the first luminance signal to generate a superposition signal having a signal level corresponding to the signal level of the highlight portion; and
      superposition means for superposing the superposition signal generated by the superposition signal generation means on the corresponding portion of the second luminance signal,
   wherein the highlight portion is detected based on a reference signal that sets the minimum signal level of the highlight portion, and
   wherein the first luminance signal is shifted by a predetermined amount selected on a basis of an average level of the first luminance signal.

2. The apparatus for processing a video signal as set forth in claim 1,
   wherein the superposition signal generation means generates the superposition signal using a look-up table in which, based on the signal level of highlight portion of the first luminance signal, a signal level of the superposition signal to be generated is made to correspond to the highlight portion signal level.

3. The apparatus for processing a video signal as set forth in claim 2,
   wherein the look-up table is stored in a nonvolatile memory.

4. The apparatus for processing a video signal as set forth in claim 1, comprising:
   shift amount detection means for detecting shift amount of the direct-current component of the first luminance signal shifted by the direct-current component shift processing means; and
   multiplication means for multiplying the superposition signal by a gain corresponding to the shift amount detected by the shift amount detection means.

5. The apparatus for processing a video signal as set forth in claim 1, comprising:
   a limiter for comparing a signal level of the first luminance signal and a signal level of the second luminance signal that has undergone the expansion processing, and outputting the second luminance signal when the signal level of the second luminance signal is equal to the signal level of the first luminance signal or smaller, while outputting the first luminance signal when the signal level of the second luminance signal is larger than the signal level of the first luminance signal.

6. A method for processing a video signal, comprising:
   a first step of shifting a direct-current component of a first luminance signal that is a luminance component of a supplied video signal to generate a second luminance signal, utilizing a shifting unit; and
   a second step of performing a predetermined expansion processing to increase a signal level of a portion of the second luminance signal to a highlight portion of the first luminance signal so that a maximum luminance level of the second luminance signal equals a maximum luminance level of the first luminance signal, utilizing an expansion processing unit,
   detecting the highlight portion based on a reference signal that sets the minimum signal level of the highlight portion, utilizing a detection unit, and
   shifting the first luminance signal by a predetermined amount selected on a basis of an average level of the first luminance,
   wherein the second step, utilizing the expansion processing unit comprises:
      a highlight portion detection step of detecting the highlight portion of the first luminance signal;
      a superposition signal generation step of generating a superposition signal having a signal level corresponding to a signal level of the highlight portion of the first luminance signal detected in the highlight portion detection step; and
      a superposition step of superposing the superposition signal generated in the superposition signal generation step on a corresponding portion of the second luminance signal.

7. The method for processing a video signal as set forth in claim 6,
   wherein, in the superposition signal generation step, the superposition signal is generated using a look-up table in which, based on the signal level of highlight portion of the first luminance signal, a signal level of the superposition signal to be generated is made to correspond to the highlight portion signal level.

8. The method for processing a video signal as set forth in claim 7,
   wherein the look-up table is stored in a nonvolatile memory.

9. The method for processing a video signal as set forth in claim 6, comprising:
   a shift amount detection step of detecting shift amount of the direct-current component of the first luminance signal shifted in the first step; and
   a multiplication step of multiplying the superposition signal by a gain corresponding to the shift amount detected in the shift amount detection step.

10. The method for processing a video signal as set forth in claim 6, comprising:
   a third step of comparing a signal level of the first luminance signal and a signal level of the second luminance signal that has undergone the expansion processing, and outputting the second luminance signal when the signal level of the second luminance signal is equal to the signal level of the first luminance signal or smaller, while outputting the first luminance signal when the signal level of the second luminance signal is larger than the signal level of the first luminance signal.

* * * * *